United States Patent
Collins et al.

(10) Patent No.: US 8,622,345 B2
(45) Date of Patent: Jan. 7, 2014

(54) PASSENGER SEAT SYSTEM INCORPORATING A MULTI-FUNCTIONAL FURNITURE UNIT, AND AN AIRCRAFT COMPRISING SUCH A SYSTEM

(75) Inventors: Alexandra Collins, Geneva (CH); Mark Collins, Geneva (CH)

(73) Assignee: Airbus, Blagnac (FR)

( * ) Notice: Subject to any disclaimer, the term of this patent is extended or adjusted under 35 U.S.C. 154(b) by 325 days.

(21) Appl. No.: 13/063,054

(22) PCT Filed: Sep. 10, 2009

(86) PCT No.: PCT/FR2009/001082
§ 371 (c)(1),
(2), (4) Date: May 16, 2011

(87) PCT Pub. No.: WO2011/030006
PCT Pub. Date: Mar. 17, 2011

(65) Prior Publication Data
US 2011/0210204 A1 Sep. 1, 2011

(30) Foreign Application Priority Data
Sep. 10, 2008 (FR) ...................................... 08 56085

(51) Int. Cl.
*B64D 11/06* (2006.01)
(52) U.S. Cl.
USPC ...................................... 244/118.6; 297/232
(58) Field of Classification Search
USPC .................... 244/118.5, 118.6; 297/232, 248; 105/315
See application file for complete search history.

(56) References Cited

U.S. PATENT DOCUMENTS

| 2,947,349 | A | 8/1960 | Kryter |
| 5,954,401 | A | 9/1999 | Koch et al. |
| 6,059,364 | A | 5/2000 | Dryburgh et al. |
| 2001/0000639 | A1 | 5/2001 | Park et al. |
| 2001/0003962 | A1 | 6/2001 | Park et al. |
| 2001/0015566 | A1 | 8/2001 | Park et al. |
| 2003/0218095 | A1* | 11/2003 | Saint Jalmes ............... 244/118.5 |
| 2007/0241232 | A1* | 10/2007 | Thompson ................. 244/118.6 |

FOREIGN PATENT DOCUMENTS

| DE | 10 2006 007854 | 8/2007 |
| GB | 2 295 962 | 6/1996 |

OTHER PUBLICATIONS

International Search Report issued Nov. 23, 2009 in PCT/FR09/001082 filed Sep. 10, 2009.

* cited by examiner

*Primary Examiner* — Rob Swiatek
(74) *Attorney, Agent, or Firm* — Oblon, Spivak, McClelland, Maier & Neustadt, L.L.P.

(57) ABSTRACT

A passenger seat system including a plurality of seat modules, in which each seat module may be configured to form a more or less flat bed. The seat modules are arranged side by side in longitudinally offset relative positions, and each seat module is configured to form a bed from a convertible seat and a fixed footrest. The footrest is integrated into a box structure, which includes an upper surface arranged as a fixed shelf for the passenger in the adjacent seat module.

10 Claims, 8 Drawing Sheets

PASSENGER SEAT SYSTEM INCORPORATING A MULTI-FUNCTIONAL FURNITURE UNIT, AND AN AIRCRAFT COMPRISING SUCH A SYSTEM

This invention relates to a passenger seat system, especially for an aircraft, and to an associated aircraft, and more particularly to such a system comprising a plurality of seat modules where each seat module may be configured to form a more or less flat bed.

On commercial aircraft flights, particularly in the classes known as higher (first class, "business" class, . . . ), the passengers are the object of special attention on the part of the aircraft manufacturers.

In particular, the passengers in the higher classes often have the possibility of tilting their seat in a more or less horizontal position, in order to convert their armchair into a bed, as for example the convertible aircraft seat such as described in the patent application EP 1 207 074 or US 2001/000639.

In order to isolate the passengers from each other and to preserve a certain privacy among the passengers, it is known, in document FR 2 904 805, to propose a seat module integrating such convertible seats and a separation panel concealing the passenger occupying the seat from the eyes of the other passengers seated in the same aircraft cabin.

To further enhance the comfort of the passengers, the bed formed in the module comprises an additional sitting surface or an ottoman, situated adjacent to the back of the module in front, which extends the armchair in a horizontal position to accommodate and support the passenger's feet. It will be easily understood that the upper surface of the additional sitting surface is more or less coplanar with the seat in bed position.

These seat modules are installed parallel to the longitudinal axis of the aircraft, either by pair aligned in a double column in the middle of the cabin (central group), or individually in a column of a single module near the two fuselages (side groups). In this way, traffic aisles are formed between the side groups and the central group.

It also is known, from document US 2007/080566, to dispose the seat modules nonparallel to the longitudinal axis of the aircraft, which has the effect of increasing the number of modules in the cabin. In the proposed cabin layout, the seat modules are arranged side by side in longitudinally offset relative position (that is to say offset along their own longitudinal axis), according to an acute angle in relation to the longitudinal axis of the aircraft. These modules also comprise an ottoman, serving as a fixed footrest which, combined with the armchair placed in more or less horizontal position, furnishes the passenger with a bed.

In document GB 2 295 692, a secondary seat is provided facing the passenger's seat so that when the latter is placed in horizontal position in order to create a bed, the secondary seat serves as an end of the bed.

In these different known configurations of seat modules, the passengers moving about in the aisles may be bothered by the direct view onto the feet of the recumbent passengers, the feet resting on the ottoman or on the secondary seat, and this despite the presence, at times, of isolation panels.

Moreover, the spaces for stowage or for setting down objects often are limited in number, the seat modules being unable to be enlarged for fear of causing the traffic aisles to be lost.

There also is known from document U.S. Pat. No. 2,947,349 a layout of rows of seats in longitudinally offset relative positive position, the rows being staggered. In this configuration, the seat for a passenger extends, to serve as a bed, into a box structure for a passenger in the preceding row.

This invention has as a purpose to resolve at least one of the aforementioned drawbacks and to propose a seat module that provides in particular an additional stowage shelf.

To this end, this invention relates in particular to a passenger seat system comprising a plurality of seat modules arranged side by side in longitudinally offset relative position, each seat module being able to be configured to form a bed from a convertible seat and a footrest, the said footrest being integrated into the interior of a fixed box structure, which box structure comprises an upper surface arranged as a fixed shelf for the passenger in the adjacent seat module and comprises, underneath the footrest, a storage compartment for the passenger in the corresponding module.

According to the invention, the box structure that accommodates the passenger's feet in its interior provides, in its upper part, a shelf for the neighboring passenger, and in its lower part, a stowage space.

In this way, the system according to the invention provides a passenger with an additional shelf surface taken from the space of the neighboring module, without changing the dimensions of the seat modules and therefore the cabin layout. The loss is minimal for the passenger deprived, since only the area at the feet, the one difficult to use, is affected.

Furthermore, the relative offset of two consecutive modules allows an ideal positioning of the additional shelf in lateral proximity to the sitting surface for the neighboring passenger, increasing the comfort of the latter.

Finally, in this way the total volume occupied by the box structure is optimized and the stowage spaces available for the passenger are enhanced, without increasing the dimensions of the seat module.

In one embodiment, the said upper surface is vertical, above the said footrest.

In this configuration, the space taken away on the neighboring module only in the volume above the footrest in bed position is optimized.

In particular, the said footrest is formed by a lower surface of an intermediate space inside the said box structure and the said fixed shelf is formed from a first portion of the top of the said box structure.

By virtue of this configuration, the footrest is in a space inside the box structure, which reduces the view of the passengers moving about in the aisles at the feet of a recumbent passenger.

It furthermore will be noted that this intermediate space may be used as stowage space when the module is in seat, and not bed, position.

In one embodiment, a second portion of the said top of the box structure of a module forms a fixed shelf for the passenger in the corresponding module.

In this configuration, the upper surface of the box structure is divided in order to provide a shelf for each of the two passengers at the same time, each passenger taking the part that is the most accessible to him.

In one embodiment, the said top of the box structure has horizontal dimensions smaller than those of the footrest. The horizontal dimensions define the horizontal surface of the upper surface of the box structure. In this configuration, the footrest surface protrudes from the box structure. This portion that protrudes thus easily may be used by a second passenger to sit down facing the passenger in the module, in seated position.

As a variant, the horizontal dimensions are identical, making it possible to optimize the available surface on the box-structure top to form fixed shelves for the various passengers.

In one embodiment of the invention, each seat module comprises a removable shelf arranged to be stored, in stowed position, in the top of the said intermediate space, added to the said box-structure top. In particular, the said removable shelf is arranged to be extracted from its stowed position by translation toward the passenger seat. In these two configurations, the space in the box structure for the feet is maximized irrespective of the use of a removable shelf that is to be stored in this space.

In one embodiment, the said upper surface arranged as a fixed shelf for the adjacent passenger comprises a vertical rim extending at least along the periphery of the fixed shelf facing the passenger in the corresponding seat module. Such a vertical rim, more or less high, acts as a separation panel shielding a passenger's shelf from the eyes of the neighboring passenger.

According to one characteristic of the invention, the said box structure forms part of a shell partially surrounding the said adjacent seat.

According to a specific embodiment, the said seat system being integrated into a vehicle, a system in which the said seat modules are arranged according to an acute angle in relation to the longitudinal axis of the said vehicle, in particular when the vehicle is an aircraft. In this configuration, the seat modules of the same column along the longitudinal axis of the vehicle are adjacent, or adjoining, for implementation of the invention. In this way the invention may be applied to all the seat groups of a vehicle, the central groups as well as the side groups of an aircraft, for example.

As a variant, the seat modules are arranged parallel to the longitudinal axis of the vehicle. In this case, the invention applies to two adjoining seat columns offset from one another, longitudinally, by a module half-length, for example. In each column, the modules may be aligned longitudinally one behind the other.

The invention also applies to a seat module and an aircraft comprising a seat system such as set forth above.

The aircraft optionally may comprise means relating to the system characteristics set forth above.

Other features and advantages of the invention also will become apparent in the description below, illustrated by the attached drawings, in which.

First, an aircraft cabin layout in accordance with an embodiment of the invention is going to be described with reference to FIG. 1.

Figure 1:
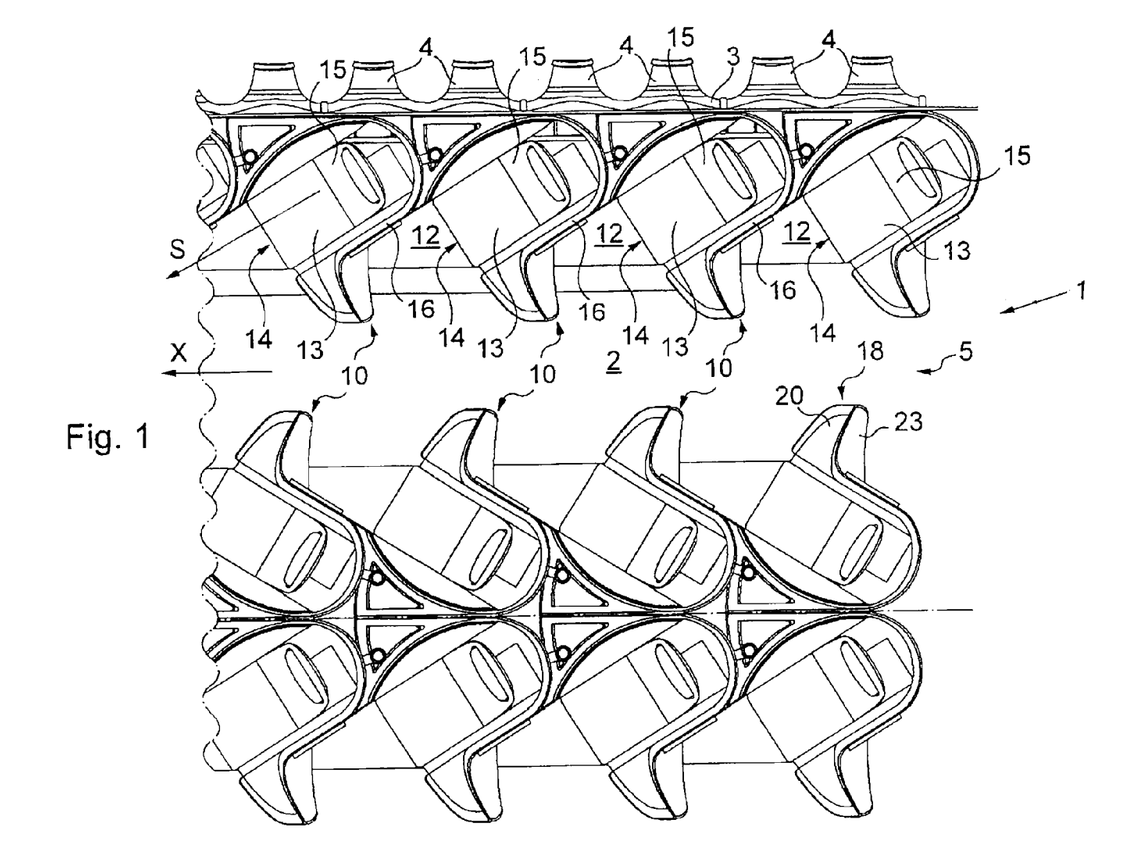
FIG. 1 is a schematic view from above of a seat module assembly with which an aircraft is equipped.

As partially shown on FIG. 1, an aircraft cabin 1 comprises a floor 2, side walls, of which only one 3 provided with windows 4 is shown, as well as a ceiling, not shown for reasons of clarity.

The cabin comprises several seat modules designated by the general reference 10 making it possible to create a place for each passenger of the aircraft.

Each module 10 comprises a seat 14 and a separation panel 16 defining a personal space 12 for the passenger.

As clearly illustrated on FIG. 1, various seat modules for a passenger are installed, namely modules 10 disposed along wall 3 of the cabin and modules 10 disposed in the central part of the cabin.

In this central part, seat modules 10 are, for example, installed in pairs.

Between the central part of the cabin and wall 3 of the cabin, seat modules 10 are placed on both sides of an aisle 5, provided in the cabin for the movement of passengers and flight crew.

Furthermore, as clearly illustrated on FIG. 1, seat modules 10 are arranged staggered, in relation to each other, on both sides of aisle 5. This layout makes it possible to increase the concealing effect produced by separation panels 16.

A seat column along longitudinal axis X of the aircraft is made up of seat modules 10 arranged side by side in longitudinally offset relative position (that is to say in relation to their own longitudinal axis S). Longitudinal axis S of seat modules 10 forms an acute angle with longitudinal axis X of the aircraft, preferably an angle ranging between 15° and 45°, for example 30°, making it possible to increase the number of seat modules 10 integrated into the same aircraft length.

For the remainder of the description, the terms "front" and "rear" will refer to longitudinal axis X to designate in particular a passenger or a seat module 10 in relation to a neighboring passenger or seat module 10 along this axis.

In each seat module 10, seat 14 itself comprises a sitting surface 13 and a back 15, positioned along axis S, allowing the passenger to be seated in standard manner in seat 14.

On FIG. 1, each seat is in an upright position, back 15 of seat 14 thus extending more or less vertically in relation in particular to floor 2 of the aircraft.

Of course, this upright position of seat 14 also includes the intermediate positions of the seat in which back 15 is slightly tilted in relation to sitting surface 13, for example by an angle of 20 to 30° in relation to the vertical.

Figure 2A:
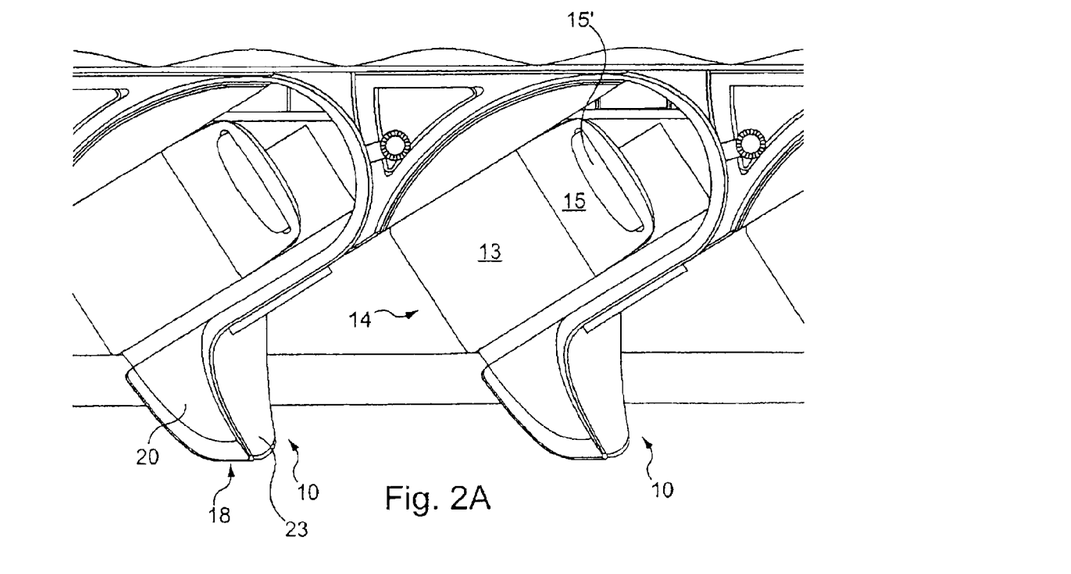
FIG. 2A illustrates a seat module in a view from above in accordance with an embodiment of the invention, the seat being in upright position.
Figure 2B:
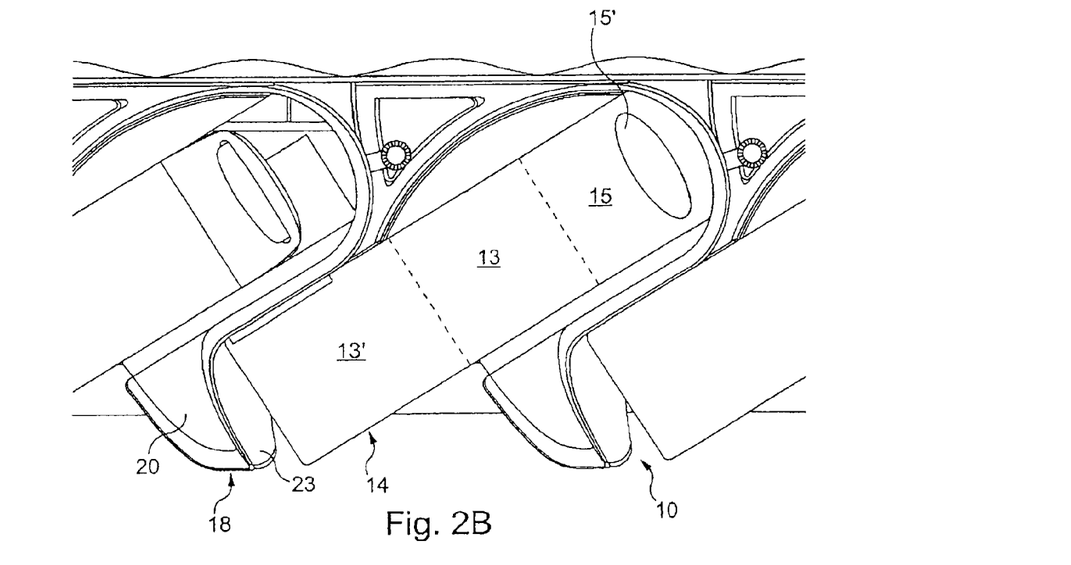
FIG. 2B is a view similar to FIG. 2A, the seat being in extended position.

FIGS. 2A and 2B illustrate a seat module 10 in greater detail, each seat 14 being movable between an upright position (FIG. 2A) and an extended position (FIG. 2B).

The mechanism allowing seat 14 to change over from the upright position to the extended position, and vice versa, is not illustrated on the Figures. This mechanism may be any mechanism, well known to the individual skilled in the art, making it possible to change the position of the seat.

In particular, in the extended position, back 15 of seat 14 extends in a more or less horizontal position, more or less in the same plane as sitting surface 13 of the seat.

As clearly illustrated on FIGS. 2A and 2B, back 15 preferably comprises a headrest 15', forming a pillow for the head of the passenger recumbent on seat 14, when the seat is in extended position.

In this way, seat 14 in extended position such as illustrated on FIG. 2B, forms a bed for the passenger.

In order to increase the length of this bed, seat 14 may further comprise a wing 13' in the continuation of sitting surface 13, adapted for moving between a more or less vertically folded back position when seat 14 is in upright position, and an extended position, more or less in the same horizontal plane as sitting surface 13 and back 15 of seat 14 when the latter is in extended position.

Figure 3A:
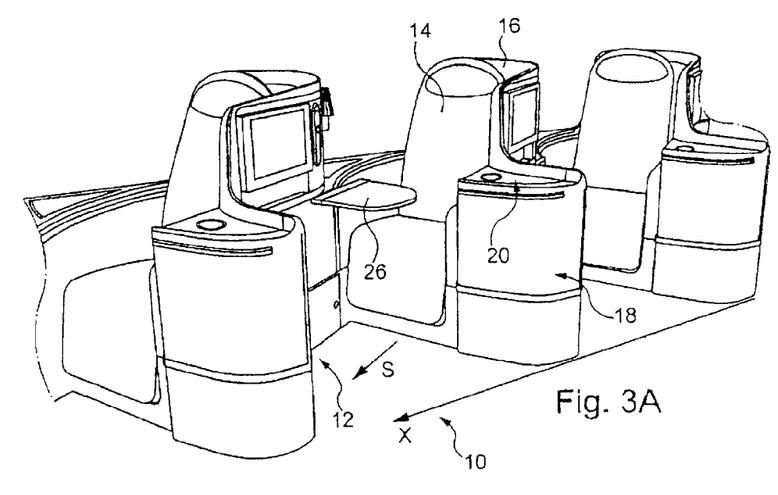
FIGS. 3A and 3B are elevation views of a column of seat modules in a layout similar to that of FIGS. 2A and 2B respectively.
Figure 3B:
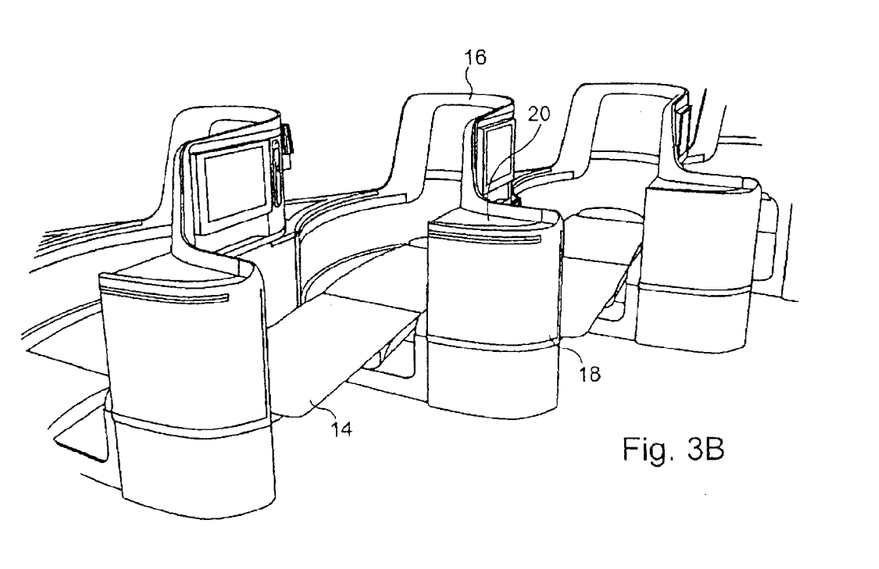

As illustrated on FIGS. 3A and 3B, in each seat module 10, separation panel or rigid shell 16 surrounds seat 14 at the sides and at the rear, and ends, on one of the sides, in the form of a box structure 18, or vertical unit, topped by a fixed shelf 20 available for the passenger.

The front part of personal area 12 is defined, facing seat 14 along axis S, by the rear of box structure 18 of the front module and, on the side opposite rear box structure 18, by shell 16 of module 10 in front. The other side of the front part is left free so as to provide an access to seat 14 and to personal space 12.

It will be noted here that, as a result of the relative offset of seat modules 10 among themselves, fixed shelf 20 is easily accessible for the front passenger, at sitting surface 13 in particular, while for the rear passenger, the corresponding box structure is far away at the feet and therefore not very convenient.

Figure 4:
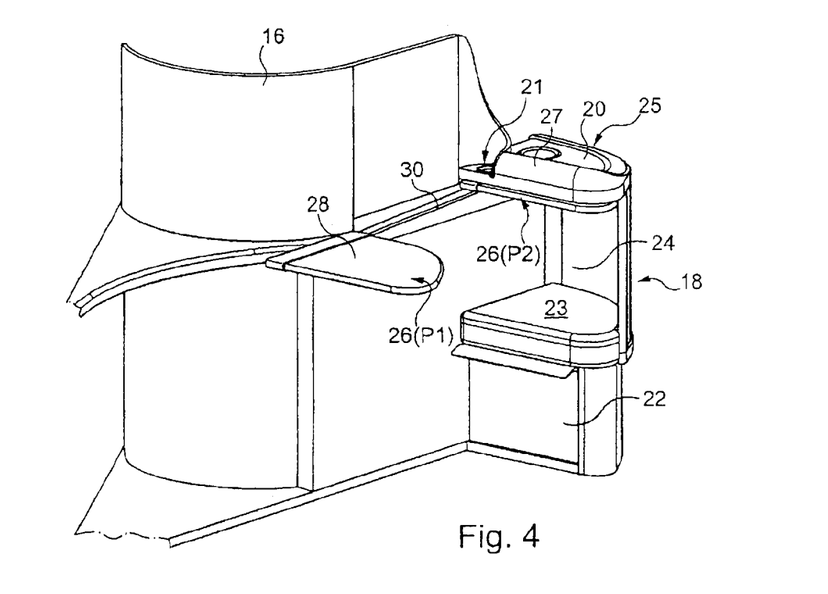
FIG. 4 shows an assembly making up a seat module of FIG. 3, integrating a removable shelf.

As illustrated on FIG. 4, box structure 18 defining the front part of area 12 comprises a bottom area 22, an intermediate area 24 and a top area 25.

Bottom area 22 is hollow, forming a stowage space for the rear passenger, closed off by a sliding door, possibly comprising a lock.

Intermediate area 24, hollow, also forms a stowage space for the rear passenger when seat 14 is in raised upright position or a space to accommodate the feet of the rear passenger when seat 14 is in extended position. Lower surface 23 in this compartment 24 then forms a footrest surface for the rear passenger.

In extended position, seat 14 is more or less coplanar with surface 23, the end of wing 13' coming to bear, for example, on the edge of surface 23.

Top 25 of box structure 18 defines, as explained above, a fixed shelf 20 used by the front passenger. A separation rim 27, extending vertically over a few centimeters and along the periphery of shelf 20 facing the rear passenger, makes it possible to conceal the contents of this fixed shelf 20 from the eyes of the rear passenger.

Top 25 of the box structure possibly comprises a fixed shelf portion 21 for the rear passenger, for example for setting down a cup or a bottle. In this case, the two fixed shelves 20 and 21 are separated by vertical separation rim 27.

On the example of FIG. 4, top 25 of box structure 18 has dimensions, in the horizontal plane, identical to those of footrest surface 23. In this way the use of the front part of seat module 10 is optimized, providing the largest possible surface for fixed shelves 20 and 21.

As a variant, such as illustrated on FIGS. 1, 2A and 2B, top 25 comprises only a fixed shelf 20 for the front passenger and has horizontal dimensions smaller than those of surface 23. In particular, the depth of top 25 parallel to axis S is smaller in comparison with the corresponding depth of surface 23.

In this way, the latter 23 partially protrudes from box-structure unit 18. This surface part 23 that protrudes may be used, when seat 14 is in upright position, as an additional sitting surface for another passenger facing seat 14 in module 10; the rim of top 25 facing seat 14 then being able to serve as a backing for the other passenger sitting on additional seat 23 formed in this way.

In bed configuration, this surface part 23 that protrudes supportively accommodates wing 13' to form a bed (see FIG. 2B).

For the sake of clarity of these Figures, the references are cited for only a limited number of modules (10) shown, even though all the modules in the cabin are equipped with the corresponding elements.

The explanations that follow concerning the retractable shelf may be applied equally well to one or the other of these two variants.

There has been shown on FIG. 3A a retractable shelf 26 (not shown on FIGS. 1, 2A and 2B, but provided in these configurations) in opened-out position, that is to say overhanging at least a part of sitting surface 13 of seat 14 for an optimum use by the corresponding passenger. On FIG. 3B retractable shelf 26 is in its stowed position (not visible).

On FIG. 4, shelf 26 has been shown in its two extreme positions, namely the fully opened-out position P1 for an optimal use by the seated passenger (idem FIG. 3A) and the fully stowed position P2 where shelf 26 is accommodated in the top of compartment 24, and added underneath fixed shelf 20 (and possibly fixed shelf 21 when it is provided).

Shelf 26 in position P2 and fixed shelf 20 (or top 25) have similar horizontal dimensions, so that removable shelf 26 disappears completely into box structure 18 in stowed position.

In these two positions P1 and P2, retractable shelf 26 has a horizontal upper surface 28. In position P1, this upper surface 28 forms the table ordinarily used by a passenger.

The movement mechanism for shelf 26, here shown by a rail 30 borne by "front" shell 16 more or less in longitudinal direction S, makes it possible to change over from one to the other of the positions, or even to take on an intermediate position, through a translation of shelf 26 along the rail. Upper surface 28 then is kept horizontal throughout the movement. In this way, the passenger may get out of his seat by simply pushing retractable shelf 26 into an intermediate position toward box structure 18, without having to remove his belongings from shelf 26.

Retractable shelf 26 is exceptional in that it has, in position P2, an upper surface 28 with smaller dimensions in comparison with position P1. Shelf 26 thus occupies less space in stowage, and provides a larger "useful" use surface for the passenger.

In this way, modules 10 are less wide in the direction perpendicular to X and aisles 5 of the aircraft therefore are more spacious. It is noted here that since box structure 18 thus is not as wide as sitting surface 13 of seat 14, wing 13', once opened out to form a bed, may protrude from the box structure as becomes apparent from FIG. 2B, without its creating a nuisance in the aisles 5.

Figure 5:
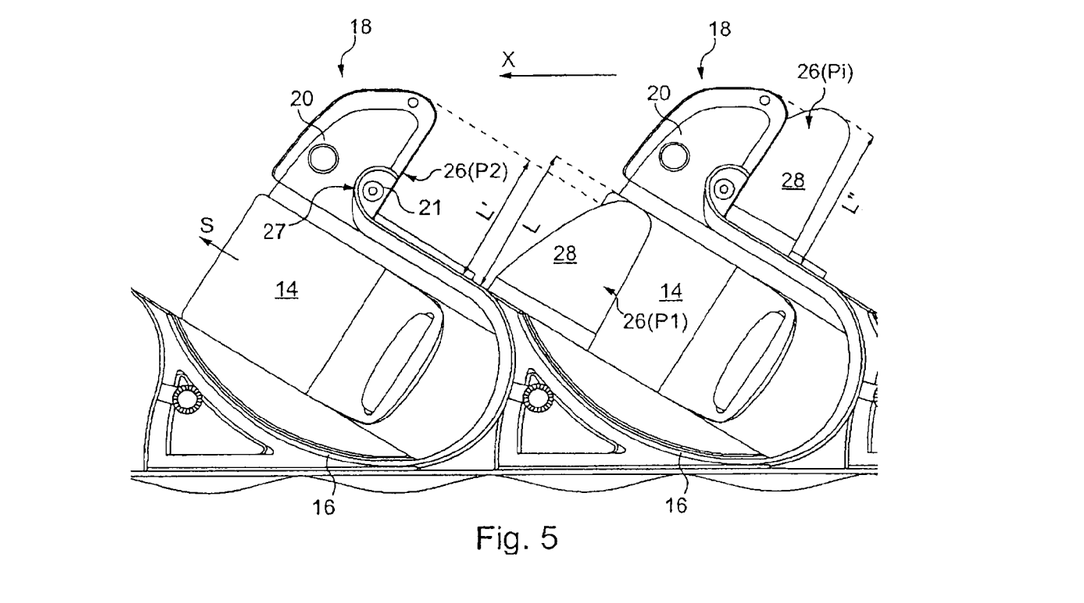
FIG. 5 is a view from above of seat modules illustrating the shelf of FIG. 4 in different positions.

With reference to FIG. 5, retractable shelf 26 has a width L in position P1 (horizontal dimension perpendicular to direction S, that is to say the width seen by the passenger) more or less equal to that of seat 14 (and of sitting surface 13).

Box structure 18 and retractable shelf 26 in position P2 have a width L smaller than L, for example three to ten centimeters less, especially five.

There also has been shown a retractable shelf 26 in intermediate position Pi, in which upper surface 28 is partially extracted from compartment 24 provided for storage thereof.

Shelf 26 already may be used in this position Pi, for example as a cocktail shelf for storing glasses.

Other intermediate positions Pi may be provided along the way between P1 and P2, for example an intermediate position allowing the passenger to get out of his seat as indicated above and in which upper surface 28 is completely outside compartment 24.

In position Pi shown, width L" of retractable shelf 26 ranges between L' and L. As will be seen subsequently, different contours governing the width of shelf 26 may be contemplated according to the degree of extraction of shelf 26 from its compartment 24.

In order to optimize the usable surface of shelf 26, there preferably is chosen a contour which ensures that the width of shelf 26 takes on maximal value L as soon as entire upper surface 28 is extracted from compartment 24.

Figure 6A:
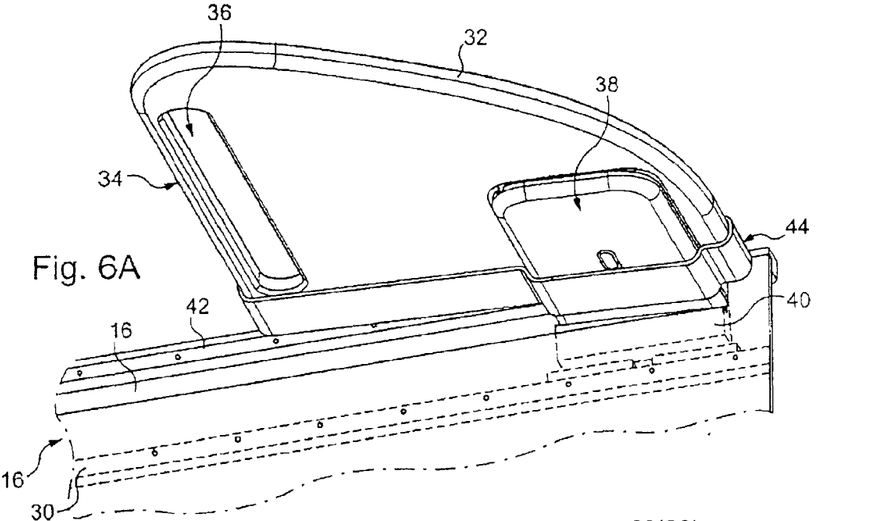
FIG. 6A is a view from below of the shelf of FIG. 4, partially showing the movement means for the shelf.
Figure 6B:
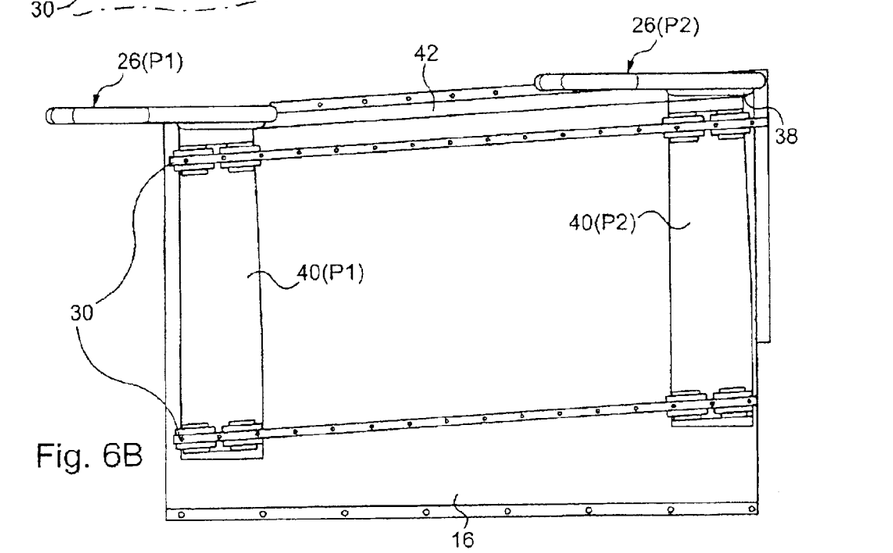
FIG. 6B illustrates the movement means for the shelf between different use positions.
Figure 6C:
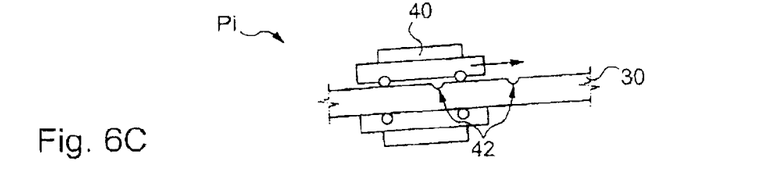
FIG. 6C illustrates means for locking the shelf in position.

The movement of shelf 26 between positions P2 and P1 now is illustrated with the aid of FIGS. 6A to 6C.

With reference to FIG. 6A, retractable shelf 26 comprises a main tray 32 with small thickness, for example less than two centimeters, which has a straight edge 34 extending over a large portion of the width of the shelf on the passenger side. From the side of this straight edge 34, the rear part of main tray 32 extends along a curve toward outer shell 16 which comes to support shelf 26 and its movement mechanism.

Box structure 18 has a shape more or less similar to that of main tray 32, so that in stowed position P2, shelf 26 follows the interior shape of box structure 18.

Main tray 32 has, in its lower face, an oblong-shape blind hole 36 extending parallel to edge 34 and serving as a handle for the passenger wishing to pull or push shelf 26. The positioning of shelf 26 stored in the upper part of compartment 24 ensures an easy access to handle 36 for the passenger.

Any other grasping means allowing the passenger to move shelf 26 may be contemplated.

Now with reference to FIG. 6B, tray 32 is fastened to means for movement by translation along one or more rails 30, here to a rigid cassette 38 parallel to the plane of tray 32, itself laterally fastened to a movable element 40 on rail 30, here a kind of slide, sliding or rolling on two rails. The movement travel of the shelf between P1 and P2 is a few tens of centimeters, generally between fifty centimeters and one meter, especially 75 and 80 cm in order to provide the passenger with a comfortable personal space 12.

The fastening of shelf 26 through cassette 38 makes it possible to minimize the space occupied underneath the shelf by the movement mechanisms, and thus to enhance the comfort of the passenger in space 24.

Under the traction or pushing exerted by the passenger on handle 36 along axis S, movable element 40 slides on rails 30 making it possible to move shelf 26 which is integral therewith between the various positions P1, P2 and Pi.

Rails 30 and movable element 40 are accommodated in the thickness of shell 16, here made up of a double wall for example. A straight slot 42 thus is provided for the passage of cassette 38 along the movement between P1 and P2.

Any means for holding movable element 40 in one of positions Pi may be provided. For example, on FIG. 6C, slight grooves 42 are made in rails 30 at appropriate places. Wheels provided on movable element 40 then come to engage into these grooves 42, locking shelf 26 into said positions Pi.

The force exerted by the passenger on handle 36 makes it possible, if need be, to disengage the movable element from these grooves in order to move shelf 26 to another position.

Grooves thus are provided at positions P1 and P2, as well as at a cocktail position P3 in which shelf 26 is partially (about half) extracted from compartment 24 and at a position P4 midway between P1 and P2 in which the passenger may easily get out of his seat.

As a variant, the holding means may be of friction type provided on the bearings of movable element 40 so that shelf 26 may take on any position along rails 30, and no longer only those created by grooves 42. The friction means ensure the locking of shelf 26 in position until a force exceeding a resistance threshold is applied to the shelf.

Appropriate means for locking shelf 26 in these various positions also may be provided, in particular a manual lock locking retractable shelf 26 in position P2 (to prevent an untimely extraction during take-off of the aircraft, for example).

As illustrated on FIG. 6B, rails 30 and slot 42 slope slightly downward from stowed position P2 to optimal use position P1. The difference in height between P2 and P1 is a few centimeters, especially three or four centimeters.

This difference in height makes it possible to combine both a low height P1 optimal for a seated passenger and high height P2 in which retractable shelf 26 "presses" as close as possible to fixed shelf 20 so as to maximize the space of volume 24 for accommodating the feet of the passenger in lying-down position or to have a larger storage space.

Cassette 38 thus is fastened to movable element 40 which supports it, with an angle similar to that of inclination of rails 30 in relation to the floor (defining the horizontal), so that shelf 26 remains horizontal in its entire movement. In this way, shelf 26 according to the invention may be used when it is hardly (partially) extracted from compartment 24.

With reference to FIGS. 7 to 10, the extension mechanism for retractable shelf 26 when the latter is pulled out of compartment 24 now is described.

Figure 7:
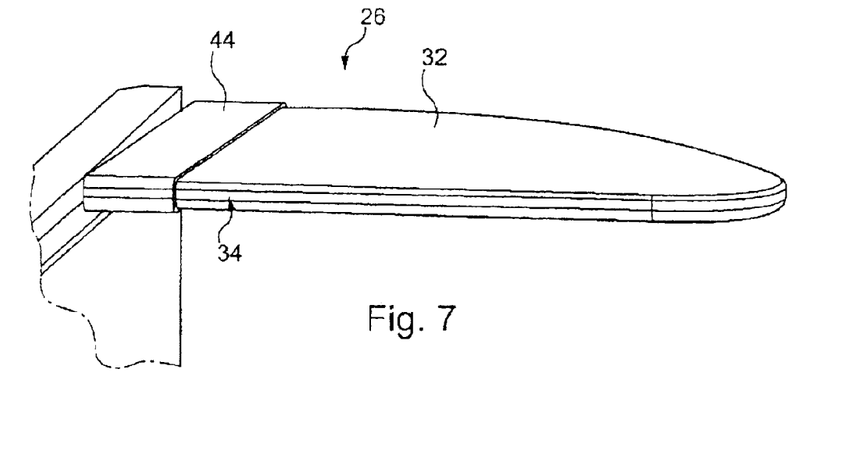
FIG. 7 shows an exemplary general structure of the shelf according to the invention.

Retractable shelf 26 consists of main tray 32 such as set forth above, and a cover 44 extending over the part of shelf 26 adjacent to shell 16 along which it moves.

Cover 44 consists of a tape that is not very thick, made of rigid plastic surrounding the edge of main tray 32 and cassette 38 added and partially fastened (as will be seen subsequently) underneath main tray 32 (see also FIG. 6A). Tape 44 is fastened, by riveting for example, to a lower casing of cassette 38.

Cover 44 is not fastened to tray 32 so that the latter is free to slide inside, in particular between a retracted position (as illustrated on FIGS. 6A and 8—edge of tray 32 in dotted lines) generally corresponding to position P2, and an extended position (illustrated on FIG. 9—edge of tray 32 in dotted lines) corresponding to the shelf in position P1.

Figure 8:
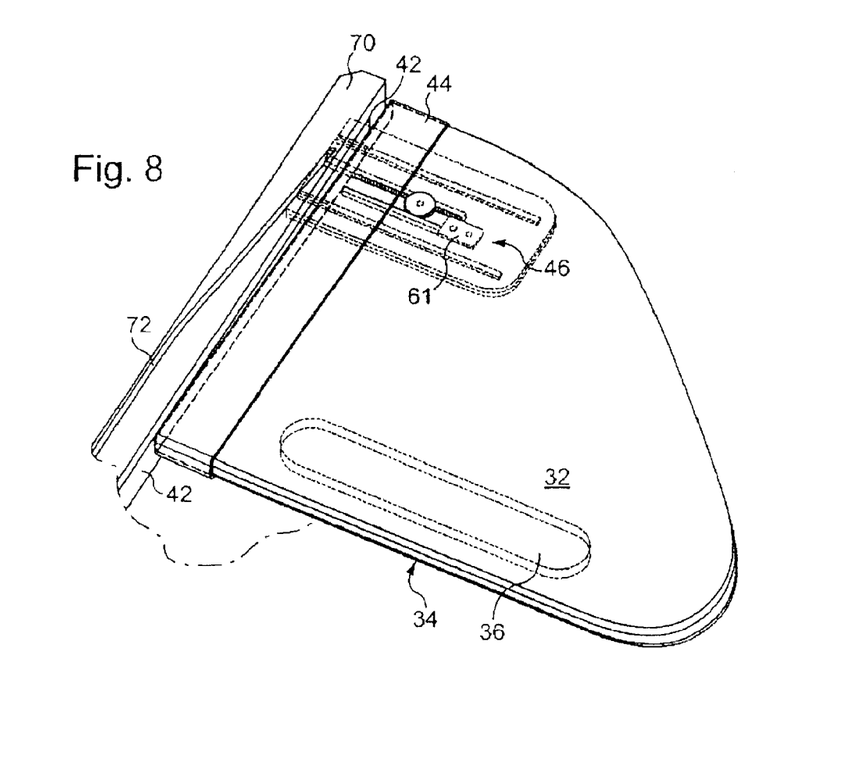
FIGS. 8 and 9 illustrate an exemplary extension mechanism for the removable shelf, in retracted position and in extended position, respectively.
Figure 9:
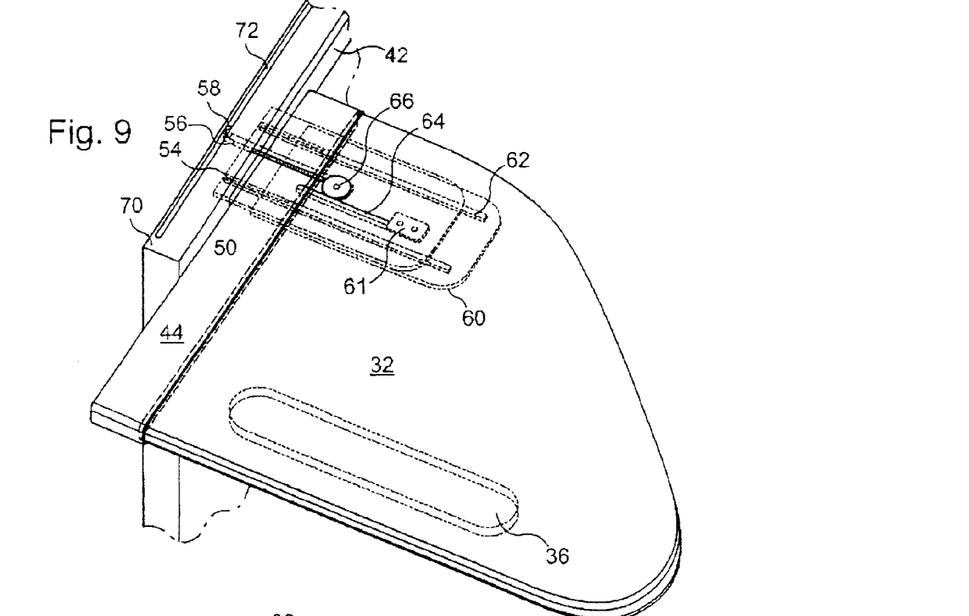

It is this translation of tray 32 by sliding in cover 44 that allows shelf 26 to have a useful upper surface 28 (comprising the upper surface of tape 44 and the upper surface of tray 32) of variable size.

In order to ensure an unbroken upper surface 28 between tape 44 and tray 32, a tape 44 with width at least equal to the contemplated lateral travel of tray 32 is chosen. This travel corresponds in particular to the difference L-L, that is for example five centimeters. In particular a tape width equal to this travel is chosen so that in extended position, the left side edge (on the Figure) of tray 32 is directly in line with the right edge of tape 44. In this way the usable surface of tray 32 in fully opened-out position P1 is maximized.

In order to improve the flatness of upper surface 28, elastic means then may be provided, for example springs provided between cassette 38 and tray 32 to raise the latter from the thickness of tape 44 when the shelf is extended. In this way the upper surfaces of tray 32 and of cover 44 are at the same level. It is noted here that the rounded side edges for tray 32 and cover 44 make it possible, under a return force exerted via the translation means such as set forth below, to bring tray 32 back down into cover 44 when shelf 26 is stowed and tray 32 is returned into the cover.

Figure 10:
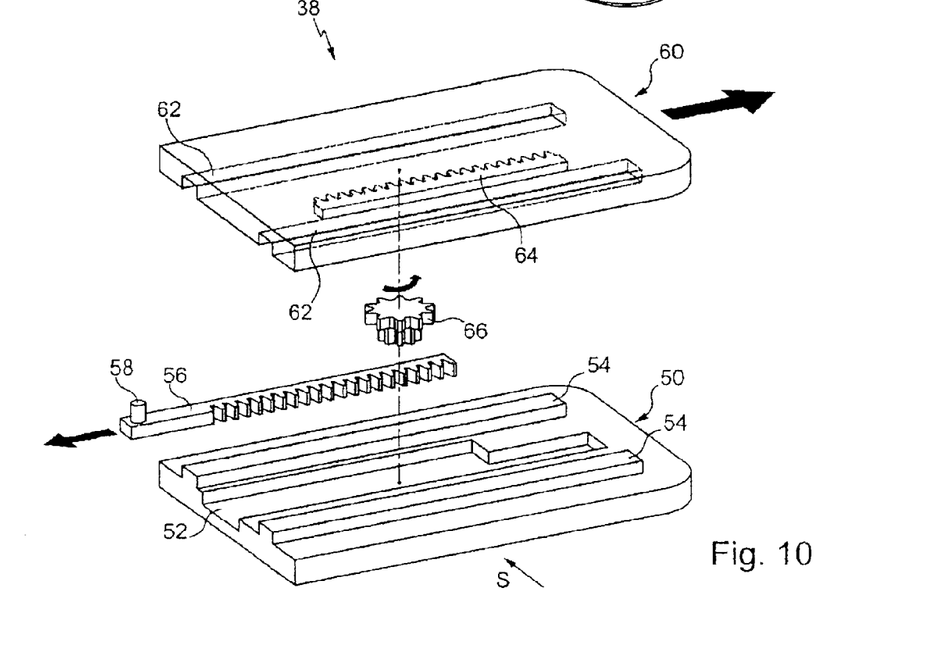
FIG. 10 is an exploded view of the extension mechanisms of FIGS. 8 and 9.

FIGS. 8 to 10 illustrate more precisely means 46 controlling the translation of tray 32 by sliding in cover 44.

These means 46 here are incorporated into cassette 38, of rigid PVC type.

Cassette 38 comprises a lower half-casing 50 and an upper half-casing 60 as shown in an exploded view on FIG. 10.

Lower half-casing 50 is fastened, by screwing at one end, to movable element 40 from which it extends perpendicular to axis S. It also is fastened to cover 44 by riveting so as to drive same during the movement of shelf 26 via movable element 40.

Lower half-casing 50 further comprises a groove 52 extending from its end fastened to movable element 40 in the longitudinal axis of cassette 38 (horizontal axis perpendicular to S), and two guides 54 parallel to groove 52 over a considerable length of the cassette.

Groove 52 is provided for accommodating the rack mechanisms introduced below and for this purpose has a variable width: wide on the movable element 40 side to accommodate two racks and narrower toward the opposite end to accommodate a single rack.

Upper half-casing 60 is fastened underneath main tray 32 of shelf 26, for example by screwing (via a plate 61).

As for upper half-casing 60, it comprises two grooves 62 more or less facing the two guides 54. On closing the two half-casings 50 and 60 on top of one another, guides 54 engage into corresponding grooves 62. In this way, upper half-casing 60 and tray 32 which is integral therewith are able to slide laterally (perpendicular to axis S) in relation to lower half-casing 50 and movable element 40.

A rack 56 is engaged into groove 52 of lower half-casing 50 and is able to slide in the longitudinal direction inside cassette 38 (perpendicular to S). A vertical finger 58 is fastened integrally to the end of rack 56 on the movable element 40 side.

A corresponding rack 64 is fastened in upper half-casing 60 and comes into groove 52 when cassette 38 is closed.

The two racks are interfaced by rack wheel 66. In this way, when rack 56 slides in corresponding groove 52, it drives rack wheel 66 in rotation, which itself drives second rack 64 in translation in the opposite direction (with the entire upper half-casing 60 and main tray 32). The arrows shown on FIG. 10 illustrate the movement of the various parts during extension of shelf 26 (changeover from P2 to P1).

In particular, rack wheel 66 has two stages, one engaging into first rack 56 and the other into second rack 64 (groove 52 being sufficiently deep to accommodate two racks 56, 64 each at the respective stage of rack wheel 66). In this way, the travel of the second rack may be easily reduced or geared-down according to that of the first rack. In particular, a rack wheel providing a ratio equal to 2 is chosen: the travel of rack 56 brings about a dual travel of rack 64.

Returning to FIG. 8, outer shell 16 comprises a vertical double wall defining an inner space where the movement mechanism made up of movable element 40 and rails 30 is accommodated. A perpendicular wall 70 comes to close off the double wall at the top. This wall 70 in particular is parallel to rails 30, that is to say, slightly sloping downward in the direction of seat 14. Slot 42 provided for the movement of cassette 38 is implemented in the outer wall of shell 16.

A non-traversing groove 72 is implemented in the lower surface of wall 70, in which finger 58 of cassette 38 comes to engage when shelf 26 is installed on module 10.

Groove 72 extends more or less over the same length as movement groove 42, and gradually moves away from the outer wall where groove 42 is implemented in the direction of seat 14. In particular, a lateral offset of 25 mm is provided between the two extreme positions.

Thus, on pulling shelf 26 toward seat 14, the shelf and movable element 40 slide on rails 30 toward the seat. At the same time, finger 58 is gradually moved way, over 25 mm, from shelf 26 via groove 72, which drives rack 56 in a similar translation in relation to lower half-casing 50 (and groove 52)) and drives rack wheel 66 in rotation.

With the ratio of 2 of wheel 66, rack 64 then moves in translation over a double distance, or 50 mm, in the opposite direction, causing tray 32 to slide out of cover 44, via the translation of upper half-casing 60 integral with tray 32 in relation to lower half-casing 50 integral with cover 44.

Correlatively, when shelf 26 is pushed toward stowage compartment 24, finger 58 and rack 56 gradually move in translation toward shelf 26. Rack 64 and tray 32 then move in translation in the other direction, ensuring the return of same inside cover 44.

As a variant of groove 72, guide ramps provided on the lower face of wall 70 may be used.

The contour of groove 72 is chosen in particular to achieve maximum lateral offset (25 mm in the above example), for a movement of shelf 26 over a distance equal to the depth of box structure 18 along axis S. In that way, shelf 26 has a maximum useful surface starting from its extraction from compartment 24.

The second part of the contour of groove 72 then is straight, parallel to the movement of shelf 26.

Figure 11:
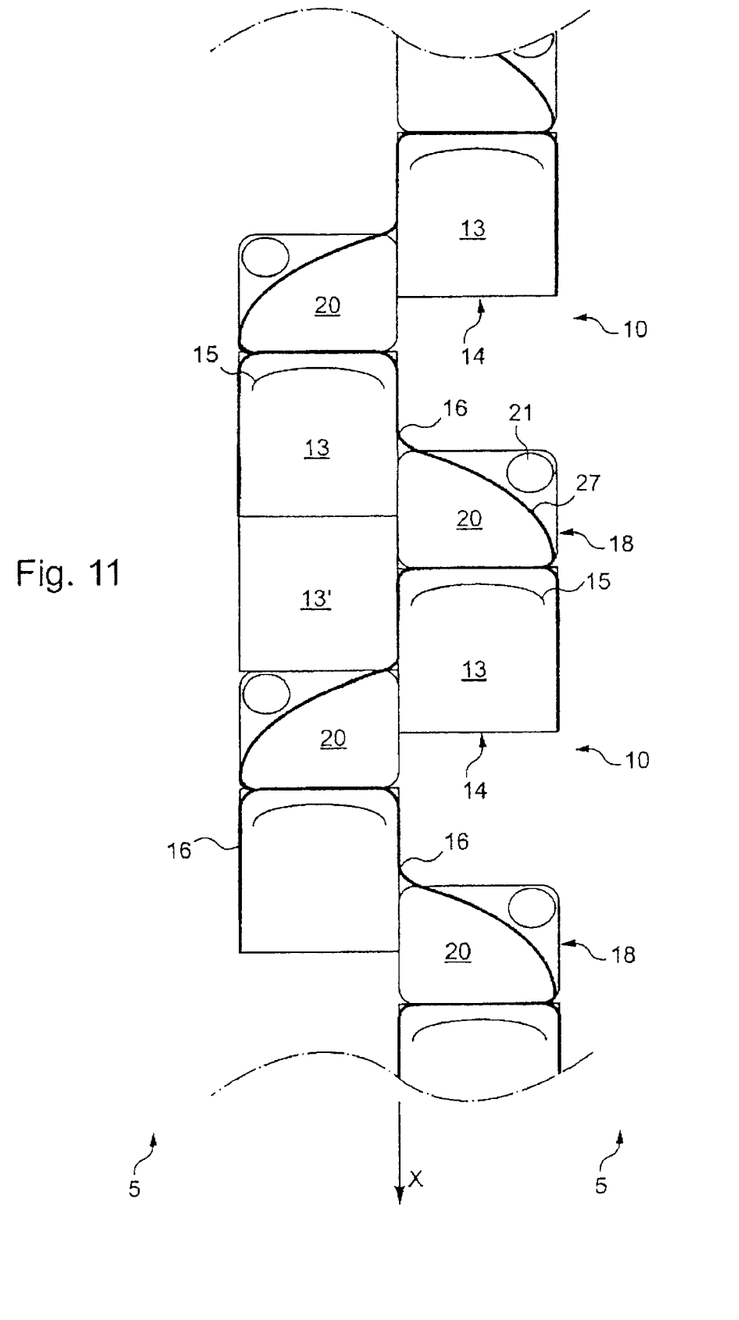
FIG. 11 shows another exemplary cabin configuration for implementation of the seat and shelf modules according to the invention.

Seat modules 10 such as described above also may be integrated into a cabin configuration such as shown on FIG. 11, showing only a central group of modules 10 in the aircraft cabin.

In this configuration, seat modules 10 are aligned one behind the other, along longitudinal axis X of the aircraft. The central group is made up of two columns of modules 10 offset longitudinally by a half-length of module 10. In this way box structure 18 of a module 10 provides the neighboring passenger with a fixed shelf 20, at the height of his sitting surface 13. It is seen here that it is not the front passenger (in the column) who gains fixed shelf 20, but the passenger directly in front in the neighboring column.

The different types of box structure 18 indicated above (with or without fixed shelf 21), with footrest part 23 protruding or otherwise from box structure 18), may be provided in this configuration, as well as removable shelves 26 such as described above.

In this cabin configuration, only modules 10 of the central cabin group thus gain an additional shelf 20 on the neighboring module. In fact, the side groups against the fuselage generally are made up of a single module in width, which does not make it possible to gain a shelf on a neighboring module.

It thus is noted that the cabin configuration shown in particular in FIG. 1, where the modules form an angle with longitudinal axis X of the aircraft, makes it possible to provide this additional shelf to all the seat modules, in the central groups as well as the side groups.

The above examples are merely embodiments of the invention which is not limited thereto.

In particular, the translation mechanism for tray 32 may be simplified by the use of a single rack integral with upper part 60 of cassette 38. The contour of groove 72 then is reversed: it gradually approaches the outer wall during movement toward the seat. In this way, the finger on the sole rack, the rack and tray 32 are driven integrally to cause the latter to slide in cover 44.

Furthermore, the invention, although described above in an aeronautical application, may be applied to any type of vehicle equipped with a seat, for example a train, but also to seat modules disposed in buildings, for example in a waiting room or a lounge.

The invention claimed is:

1. A passenger seat system, comprising:
    a plurality of seat modules arranged side by side in longitudinally offset relative positions, each seat module configured to form a bed from a convertible seat and a footrest,
    wherein the footrest of a considered seat module is integrated into an interior of a fixed box structure, which box structure comprises an upper surface arranged as a fixed shelf for a passenger in a seat module adjacent to the considered seat module and comprises, underneath the footrest, a stowage compartment for the passenger in the considered seat module.

2. A seat system according to claim 1, in which the upper surface is substantially horizontal and is positioned vertically, above the footrest.

3. A seat system according to claim 2, in which the footrest includes a lower surface of an intermediate space inside the box structure and the fixed shelf includes a first portion of a top part of the box structure.

4. A seat system according to claim 3, wherein the upper surface arranged as the fixed shelf includes a second portion of the top of the box structure of a module for the passenger in the considered seat module.

5. A seat system according to claim 3, in which the top of the box structure has horizontal dimensions smaller than those of the footrest.

6. A seat system according to claim 3, in which each seat module comprises a removable shelf configured to be stored, in stowed position, in the top of the intermediate space, added to the box-structure top.

7. A seat system according to claim 1, in which the upper surface arranged as a fixed shelf for the adjacent passenger comprises a vertical rim extending at least along a periphery of the fixed shelf facing the passenger in the considered seat module.

8. A seat system according to claim 1, in which the box structure forms part of a shell partially surrounding the seat module adjacent to the considered seat module.

9. A seat system according to claim 1, the seat system being integrated into a vehicle, in which system the seat modules are arranged along an acute angle in relation to the horizontal axis of the vehicle.

10. An aircraft comprising a system according to claim 1.

* * * * *